(12) United States Patent
Wadsworth et al.

(10) Patent No.: US 12,194,690 B2
(45) Date of Patent: Jan. 14, 2025

(54) SYSTEM AND METHOD FOR WELDING THERMOPLASTIC COMPONENTS TO CREATE COMPOSITE STRUCTURE

(71) Applicant: Spirit AeroSystems, Inc., Wichita, KS (US)

(72) Inventors: Mark Wadsworth, Sedan, KS (US); Kerrick Robert Dando, Wichita, KS (US); Rahbar Nasserrafi, Andover, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 417 days.

(21) Appl. No.: 17/590,147

(22) Filed: Feb. 1, 2022

(65) Prior Publication Data

US 2022/0152939 A1    May 19, 2022

Related U.S. Application Data

(63) Continuation-in-part of application No. 17/307,343, filed on May 4, 2021, now Pat. No. 11,325,320.
(Continued)

(51) Int. Cl.
*B29C 65/20* (2006.01)
*B29C 65/00* (2006.01)
*B29C 65/30* (2006.01)

(52) U.S. Cl.
CPC .......... *B29C 65/2053* (2013.01); *B29C 65/30* (2013.01); *B29C 66/43* (2013.01); *B29C 66/721* (2013.01); *B29C 66/91231* (2013.01)

(58) Field of Classification Search
CPC ..... B29C 65/2053; B29C 65/30; B29C 66/43; B29C 66/721; B29C 66/91231
(Continued)

(56) References Cited

U.S. PATENT DOCUMENTS

| 10,703,049 B2 | 7/2020 | Wadsworth |
| 11,077,624 B2* | 8/2021 | Wadsworth ....... B29C 66/91212 |
| 11,325,320 B2* | 5/2022 | Wadsworth ....... B29C 66/91231 |

FOREIGN PATENT DOCUMENTS

FR    3108553    1/2021

OTHER PUBLICATIONS

European Search Report in related EP Application 23154353.9 mailed Jun. 6, 2023, 8 pages.

* cited by examiner

*Primary Examiner* — James D Sells
(74) *Attorney, Agent, or Firm* — Stinson LLP

(57) ABSTRACT

A system and method for welding thermoplastic components by positioning and moving a heated plate between the components to melt their respective faying surfaces, and as the plate moves, pressing the components together so that the melted faying surfaces bond together as they cool and re-solidify, thereby creating a composite structure. The plate has a heated portion which is positioned between and heated to melt a portion of the first and second faying surfaces. A manipulator mechanism moves the plate along an interface from between the portion to between a series of subsequent portions of the first and second faying surfaces, thereby welding the thermoplastic components along the entire interface to create the composite structure. An injection device may also move behind the plate and reciprocally inject a polymer between the first and second faying surfaces to provide toughness and crack arresting properties.

19 Claims, 14 Drawing Sheets

Related U.S. Application Data which is a continuation of application No. 16/874,069, filed on May 14, 2020, now Pat. No. 11,077,624, which is a continuation of application No. 16/013,420, filed on Jun. 20, 2018, now Pat. No. 10,703,049.

(58) Field of Classification Search
USPC .............................................. 156/580, 583.1
See application file for complete search history.

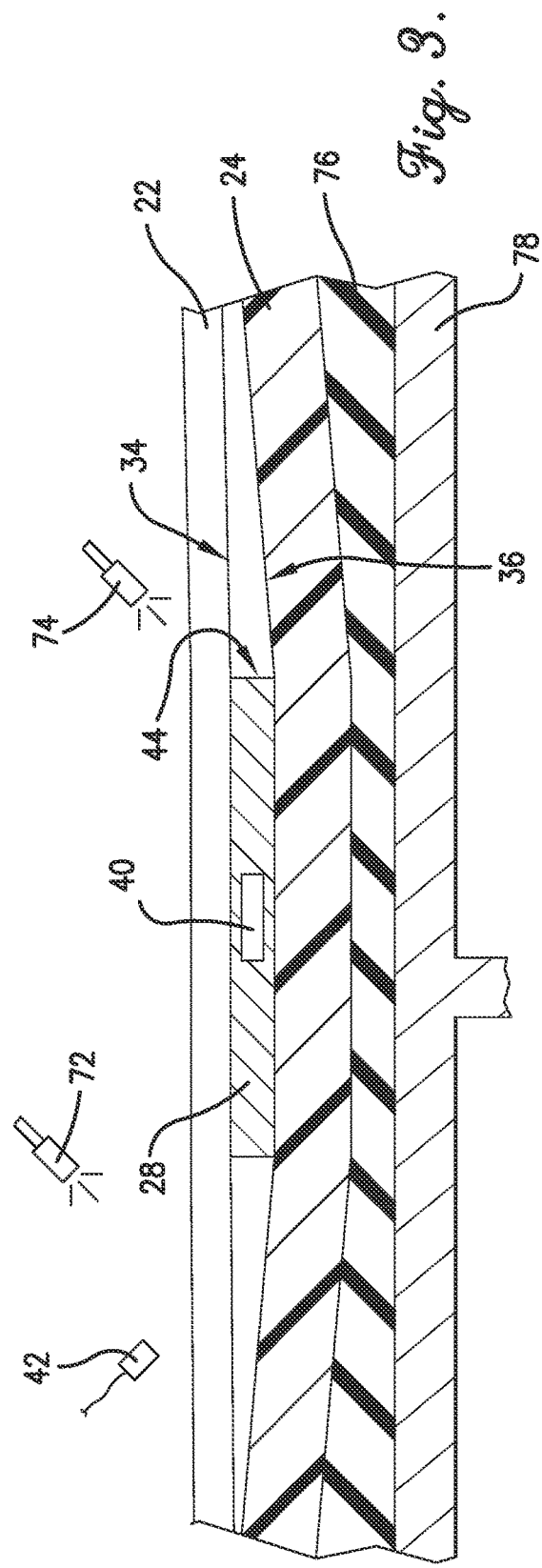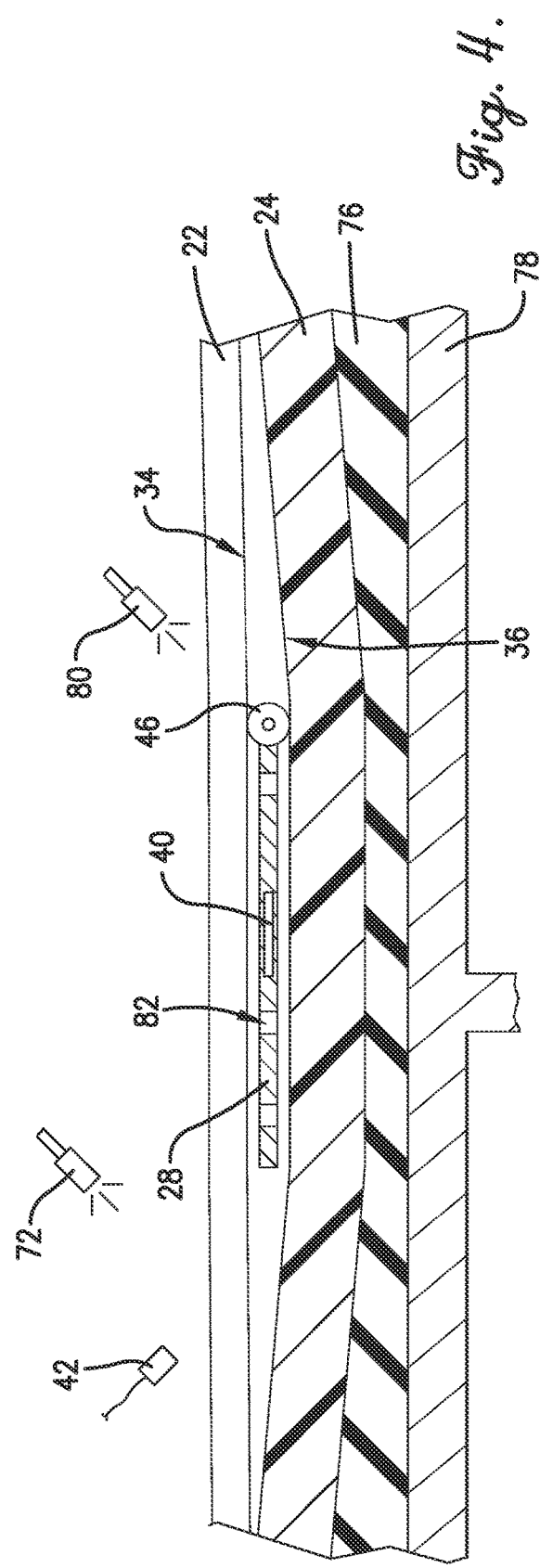

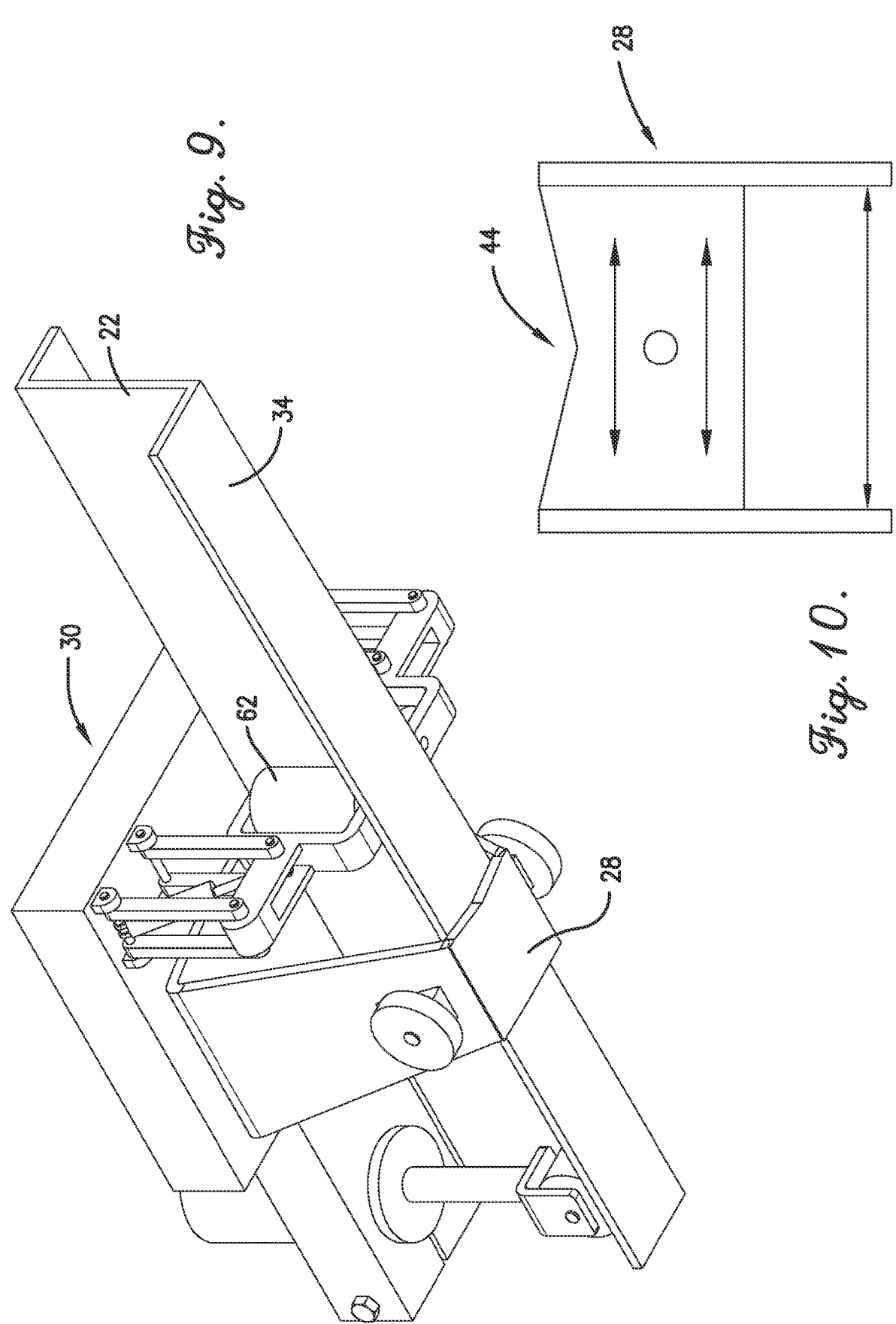

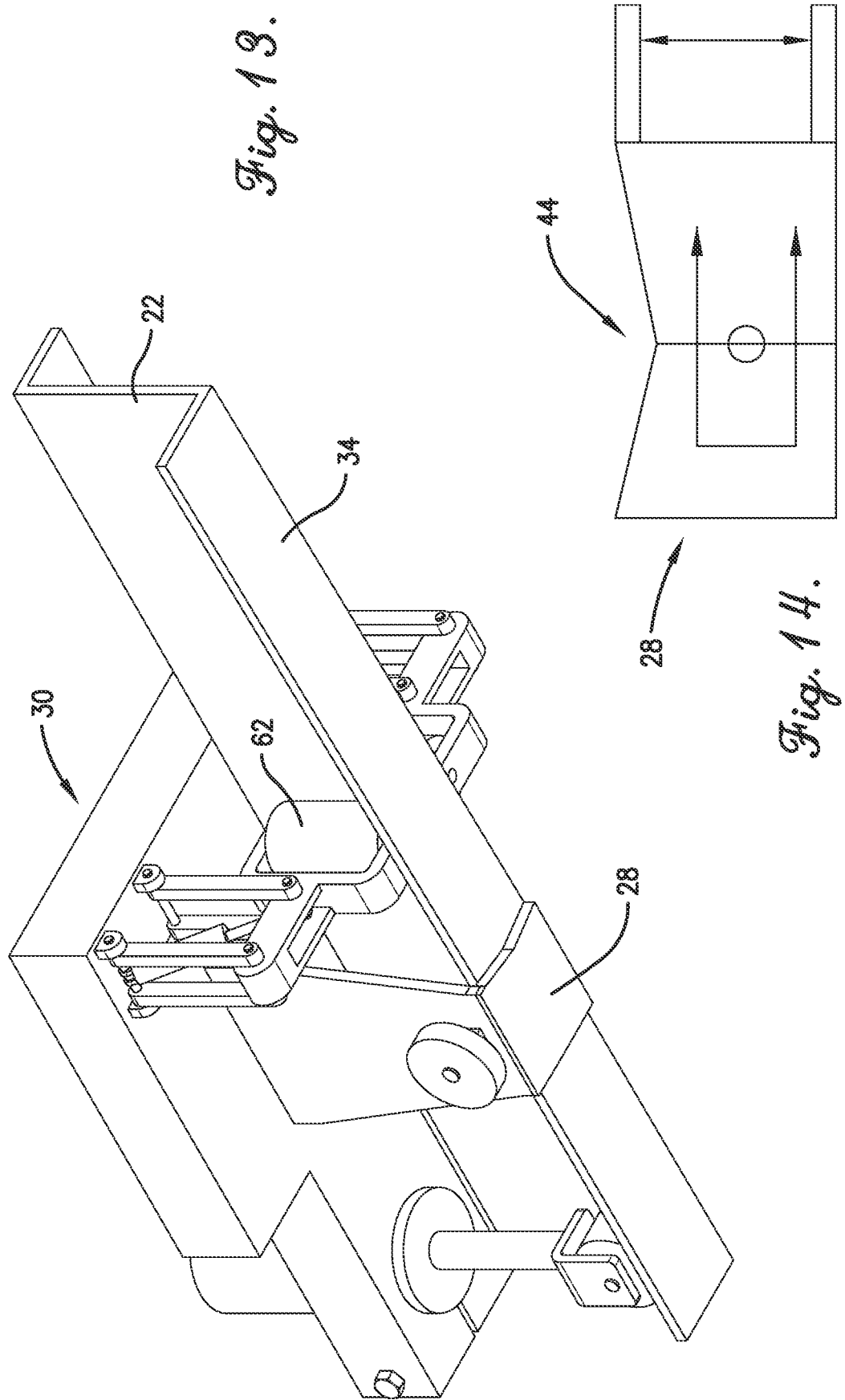

SYSTEM AND METHOD FOR WELDING THERMOPLASTIC COMPONENTS TO CREATE COMPOSITE STRUCTURE

RELATED APPLICATIONS

The present U.S. non-provisional patent application is a continuation in part and claims priority benefit of an earlier-filed patent application with the same title, Ser. No. 17/307,343, filed May 4, 2021, which is likewise a continuation and claims priority benefit of an earlier-filed U.S. non-provisional patent application with the same title, Ser. No. 16/874,069, filed May 14, 2020, and an earlier-filed U.S. non-provisional patent application with the same title, Ser. No. 16/013,420, filed Jun. 20, 2018. The entire contents of the identified earlier-filed applications are incorporated by reference as if fully set forth herein.

FIELD

The present invention relates to systems and methods for creating composite structures, and more particularly, embodiments concern a system and method for welding thermoplastic components by positioning and moving a heated plate element between the components to melt the respective faying surfaces while also injecting miscible and/or amorphous polymer therebetween, and as the plate element moves, pressing the components together so that the melted faying surfaces bond together as they cool and re-solidify, thereby creating a composite structure.

BACKGROUND

Thermoplastics are polymers, typically synthetic resins, that melt when heated and solidify when cooled. Thermoplastic laminate components can be welded by heating and then cooling faying surfaces between the components to bond them together to form composite structures. The most common techniques for thermoplastic composite welding are induction welding, ultrasonic welding, and resistance welding, but each of these techniques suffers from particular disadvantages.

Induction welding using a susceptor involves incorporating a foreign material into the weld line, which has undesirable effects on structural integrity and reliability. Induction welding without using a susceptor can be difficult to control and requires substantial engineering and design to determine the correct coil and heat sink configuration to avoid temperature control problems and resin degradation or poor welds. Further, nearby metal, such as a lightning strike protection conductor, can act as a susceptor and cause additional heat distribution issues. Ultrasonic welding requires an energy director in the weld line, results in lower strength welds, can distort fiber alignment, and is difficult to use for continuous welds. Resistance welding using a carbon fiber resistive element in the weld line creates continuous welds with good strength. However, resistance welding is difficult to use in production processes because the entire resistance circuit is heated simultaneously and therefore must be clamped and supported throughout the entire welding process. Further, provisions for making reliable electrical bonds to the fibers are not conducive to automation, and individual locations are not temperature controlled, and instead, the entire circuit is on a single channel. Further, it is generally important to avoid degrading/deconsolidating the laminate components due to overheating, so techniques that generate too much heat beyond the faying surfaces may require heat mitigation (e.g., heat sink technology).

Traditional hot plate welding is another common technique in which an entire weld area is heated at the same time with a contoured plate and then the melted surfaces are brought together. However, this can result in difficulty initially aligning and thereafter maintaining the positions of the thermoplastic components due to the instability of the melted faying surfaces. It is also known to weld the seams of products made of thermoplastic fabrics, such as tents, tarps, and parachutes. However, the nature of the materials makes this welding process substantially different than materials welded using the techniques described above. In particular, the fabrics are much more flexible and are initially separated and brought together at the time of welding, while the materials at issue are relatively stiff (one may even be a stiffener structure) and are already aligned and maintained in particular positions at the time of welding.

This background discussion is intended to provide information related to the present invention which is not necessarily prior art.

SUMMARY

Embodiments address the above-described and other problems and limitations by providing a system and method for welding thermoplastic components by positioning and moving a heated plate element between the components to melt the respective faying surfaces, and as the plate element moves, injecting a polymer between the faying surfaces following the heated plate element, and pressing the components together so that the melted faying surfaces bond together as they cool and re-solidify, thereby creating a composite structure. The polymer may be a miscible and/or an amorphous polymer and may act as a crack-arresting feature at a weld line of the thermoplastic components where the polymer will not be exposed to fluids.

In one embodiment, a system is provided for welding a first thermoplastic component to a second thermoplastic component along an interface to create a composite structure. Broadly, the system may include a plate, a manipulator mechanism, an injection device, and a support surface. The plate may have a heated portion which may be positioned between a portion of a first faying surface of the first thermoplastic component and a second faying surface of the second thermoplastic component. The heated portion may be heated to an operating temperature which is sufficient to melt the portion of the first and second faying surfaces. The injection device may deposit polymer between the first faying surface and the second faying surface after the plate passes therebetween. The manipulator mechanism may move the plate along the interface between the first and second faying surfaces, which then cool and bond together and thereby weld the first thermoplastic component to the second thermoplastic component along the interface to create the composite structure. The support surface may be positioned against the second thermoplastic composite component and may be flexible so as to accommodate a flexing of the second thermoplastic composite component due to the plate positioned and moving between the first and second faying surfaces.

In another embodiment, a method for welding a first thermoplastic composite component to a second thermoplastic composite component along an interface to create a composite structure may include a step of aligning the first and second thermoplastic composite components along the interface, such that a first faying surface of the first thermoplastic composite component is in contact with a second faying surface of the second thermoplastic composite component. The method may also include positioning a plate between a portion of the first faying surface and the second faying surface and heating at least a portion of the plate to a temperature which is sufficient to melt the portion of the first and second faying surfaces. Furthermore, the method may include moving the plate with a manipulator mechanically coupled with the plate in a direction along the interface from between the portion of the first and second faying surfaces to between a series of subsequent portions of the first and second faying surfaces, such that the first faying surface remains in contact with the second faying surface in front of and behind the plate relative to the direction the plate is moving. The method may also include actuating a needle of an injection device behind the plate to deposit polymer between the first faying surface and the second faying surface.

This summary is not intended to identify essential features of the present invention and is not intended to be used to limit the scope of the claims. These and other aspects of the present invention are described below in greater detail.

DRAWINGS

Embodiments of the present invention are described in detail below with reference to the attached drawing figures, wherein:

FIG. 3 is a fragmentary cross-sectional side elevation view of a first or "contact" implementation of the system of FIG. 1;

FIG. 4 is a fragmentary cross-sectional side elevation view of a second or "gap" implementation of the system of FIG. 1;

FIG. 9 is an isometric fragmentary view of the system of FIG. 5 showing the plate element component in operation;

FIG. 10 is a plan view of the plate element component of FIG. 5 showing a rake angle;

FIG. 13 is an isometric fragmentary view of the system of FIG. 11 showing the plate element component in operation;

FIG. 14 is a plan view of the plate element component of FIG. 11 showing a rake angle;

Figure 18:
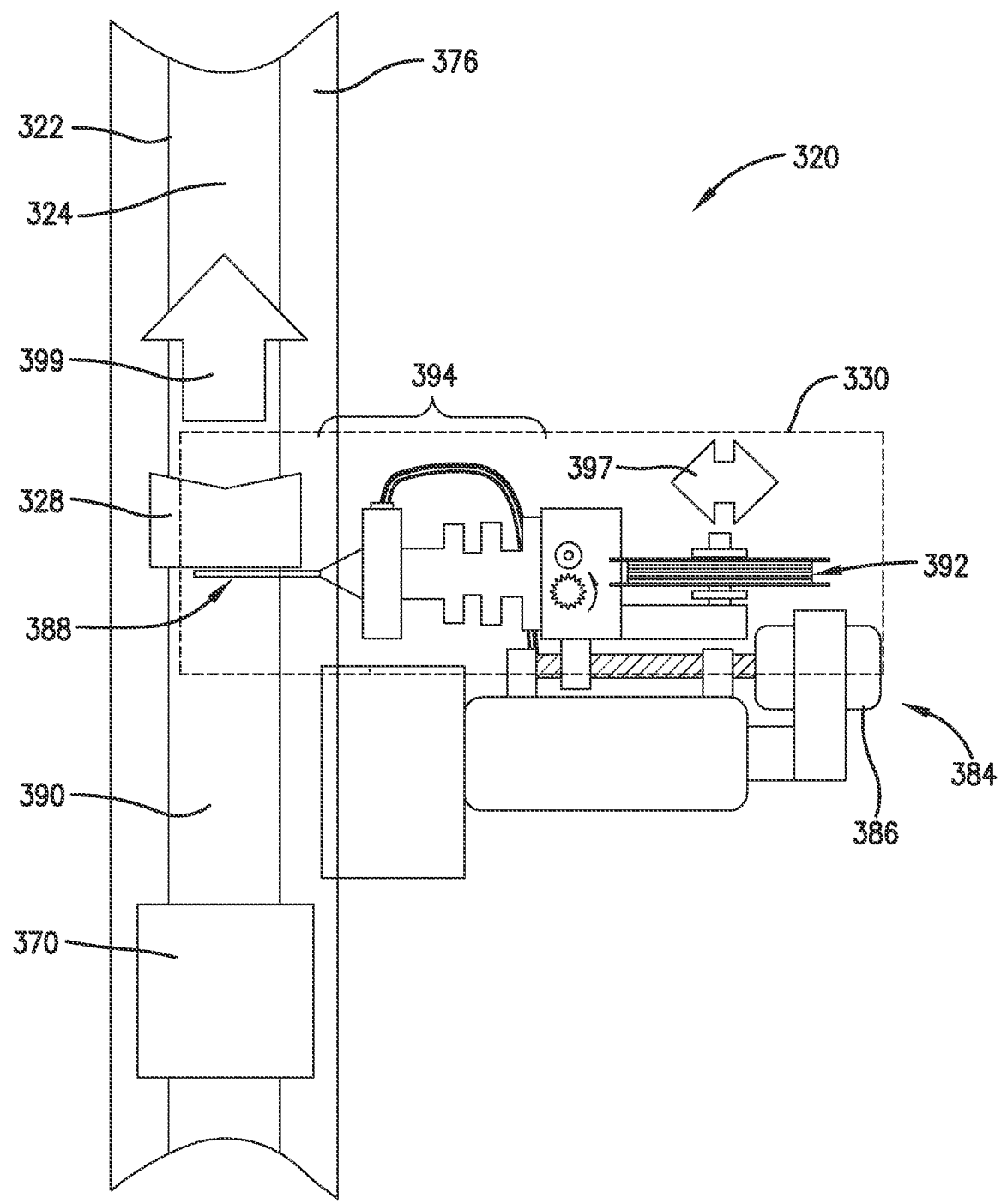
Figure 19:
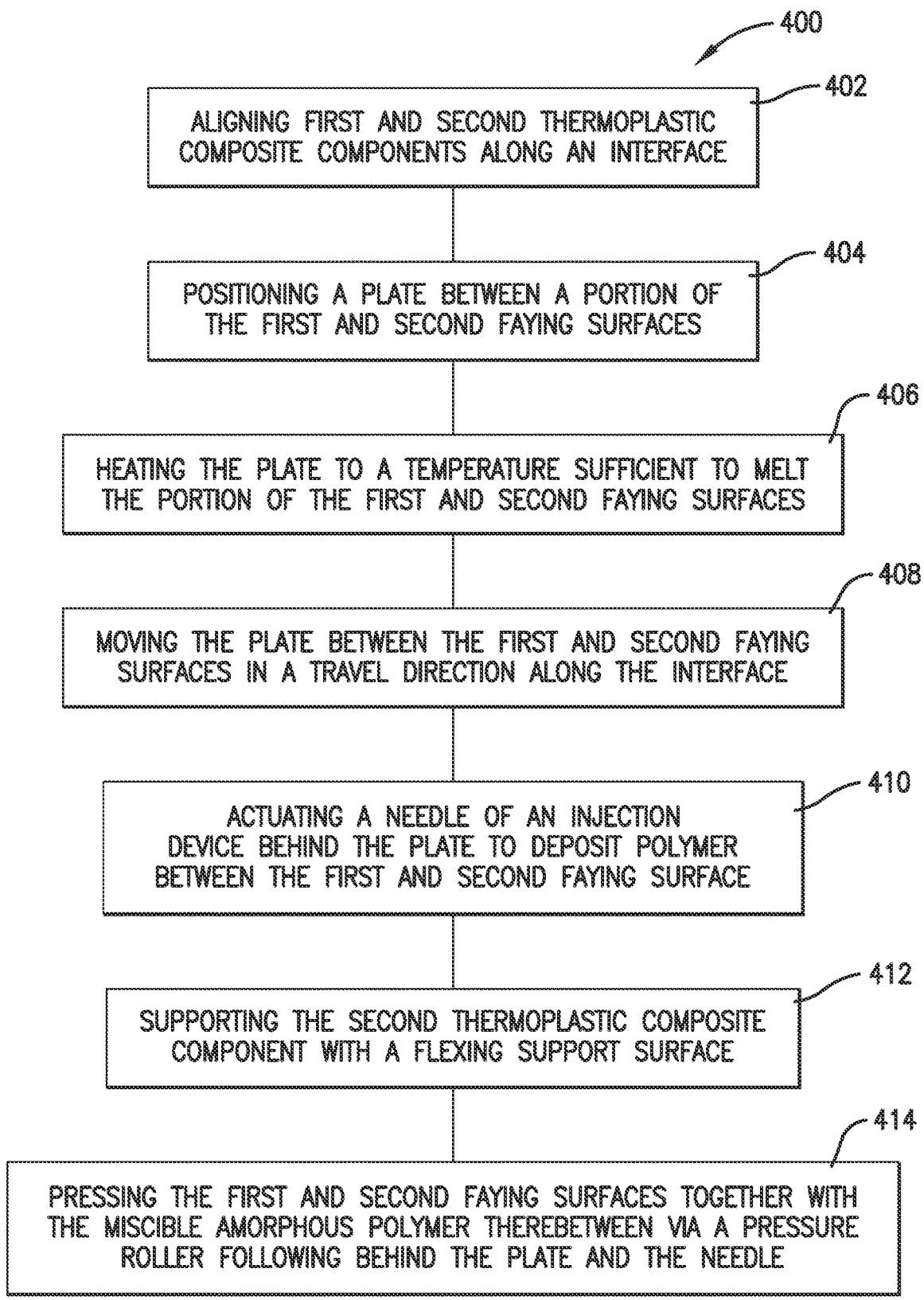

FIG. 18 is a top plan view of an alternative embodiment of a system for welding first and second thermoplastic components in accordance with embodiments herein, additionally including an injection device for injecting polymer into a weld joint; and FIG. 19 is a flow chart of steps involved in another method of welding first and second thermoplastic components in accordance with embodiments herein, additionally including injecting polymer into a weld joint.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, embodiments provide a system and method for welding thermoplastic components by positioning and moving a heated plate element between the components to melt the respective faying surfaces, and as the plate element moves, pressing the components together so that the melted faying surfaces bond together as they cool and re-solidify, thereby creating a composite structure. In contrast to traditional hot plate welding which heats the entire weld area at the same time, embodiments utilize the motion of the plate element and the stiffness of the components and/or an underlying support surface to provide a clamping force against the plate element to join the melted surfaces. Further, unlike in traditional hot plate welding, there may be little or no movement of the components themselves because the faying surfaces are kept together and are only separated by the thin plate element moving between them during the welding process. Although described herein in the example context of manufacturing aircraft, the present technology may be adapted for use in substantially any suitable application (in, e.g., the automotive and/or shipbuilding industries) involving welding thermoplastic components.

Figure 1:
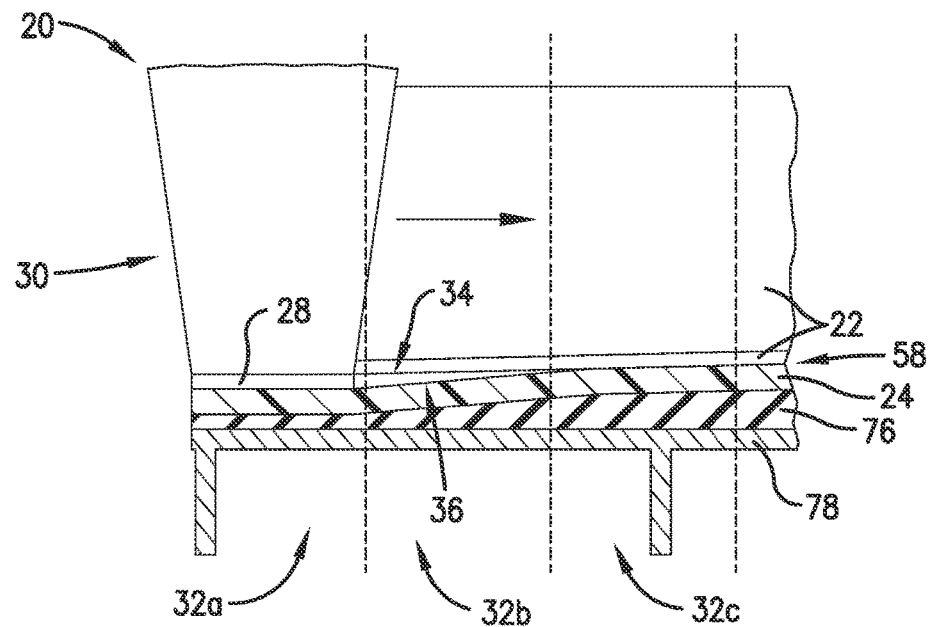
FIG. 1 is a fragmentary cross-sectional side elevation view of an embodiment of a system for welding first and second thermoplastic component to create a composite structure, wherein the system is shown in a starting position.
Figure 2:
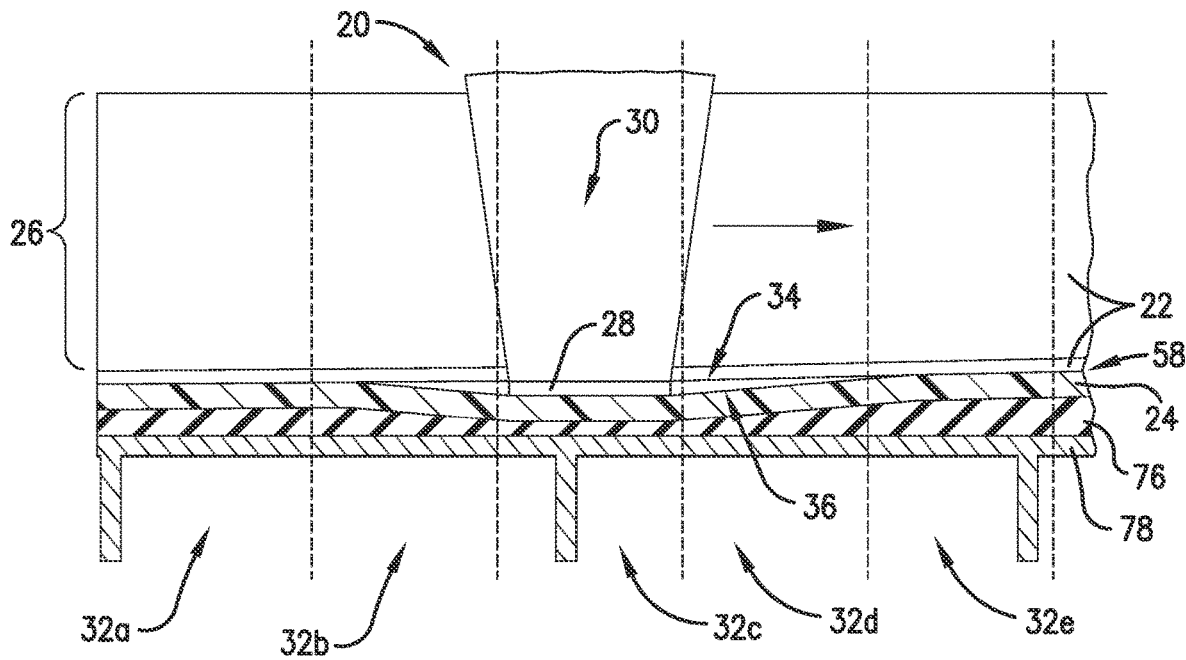
FIG. 2 is a fragmentary cross-sectional side elevation view of the system of FIG. 1, wherein the system is shown moving along an interface between the first and second thermoplastic components.
Figure 5:
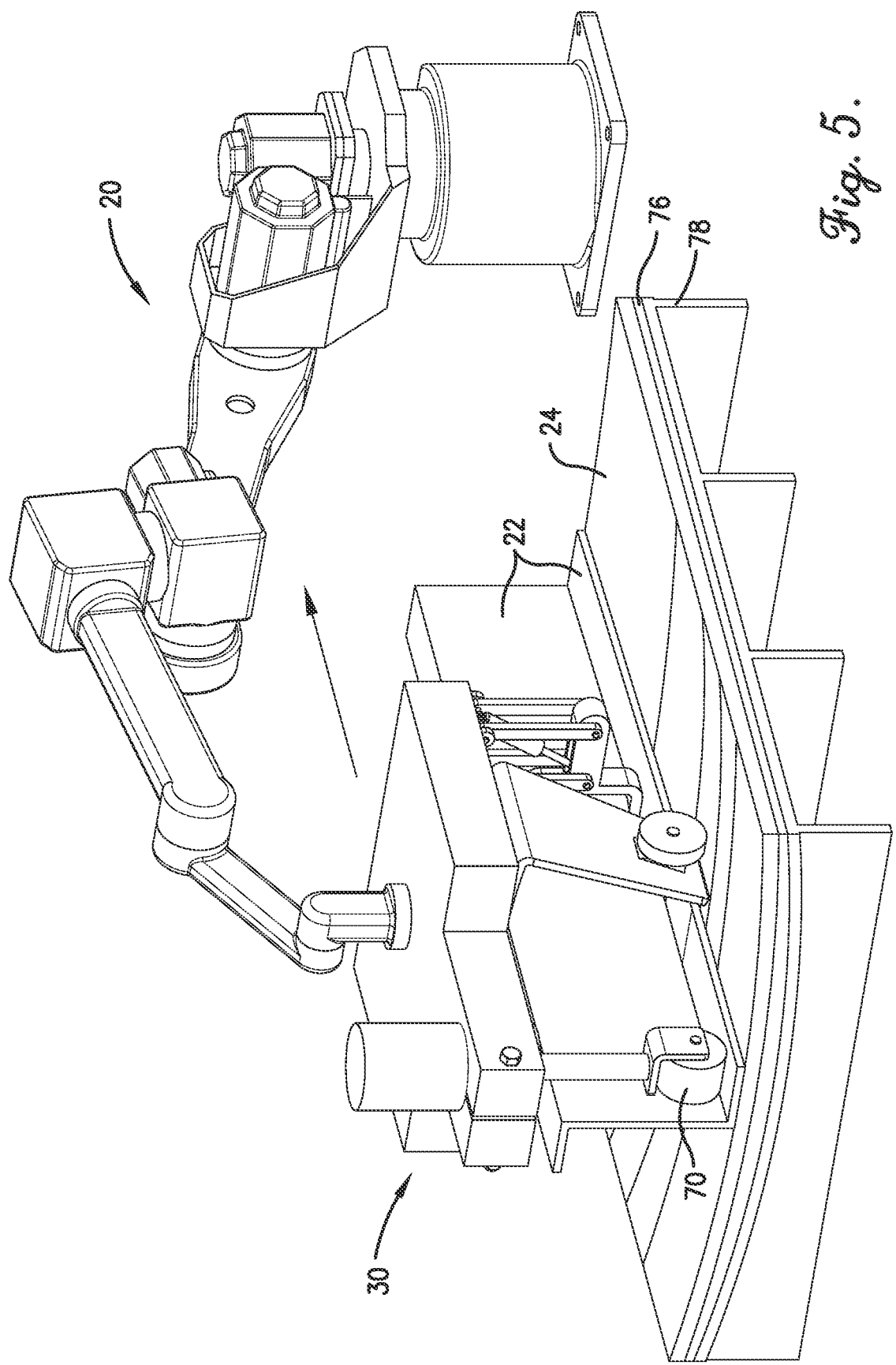
FIG. 5 is an isometric view of an implementation of the system of FIG. 1, wherein a plate element component of the system is supported on both sides.
Figure 6:
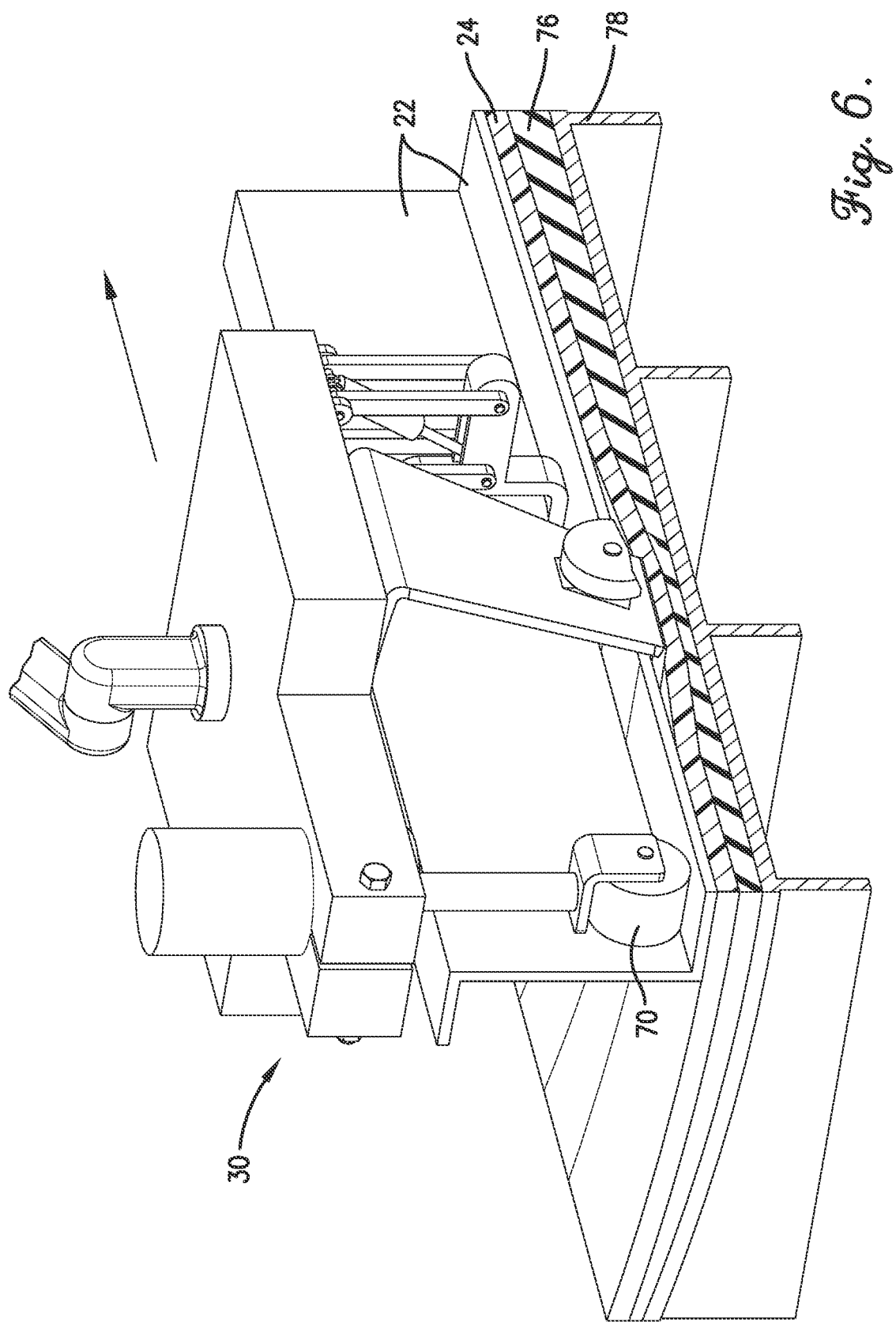
FIG. 6 is a fragmentary cross-sectional isometric view of the system of FIG. 5.
Figure 7:
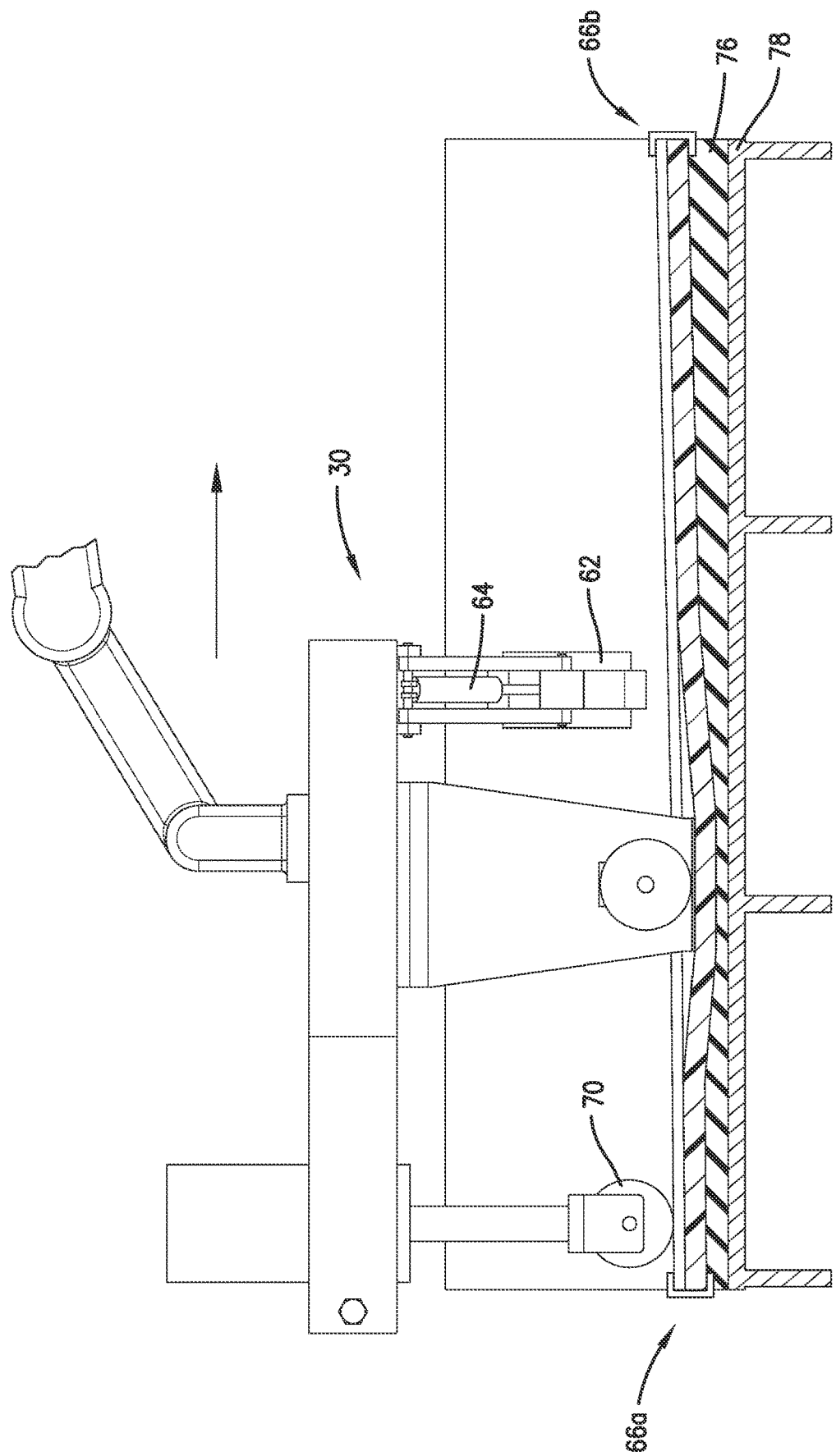
FIG. 7 is a fragmentary cross-sectional side elevation view of the system of FIG. 5.
Figure 8:
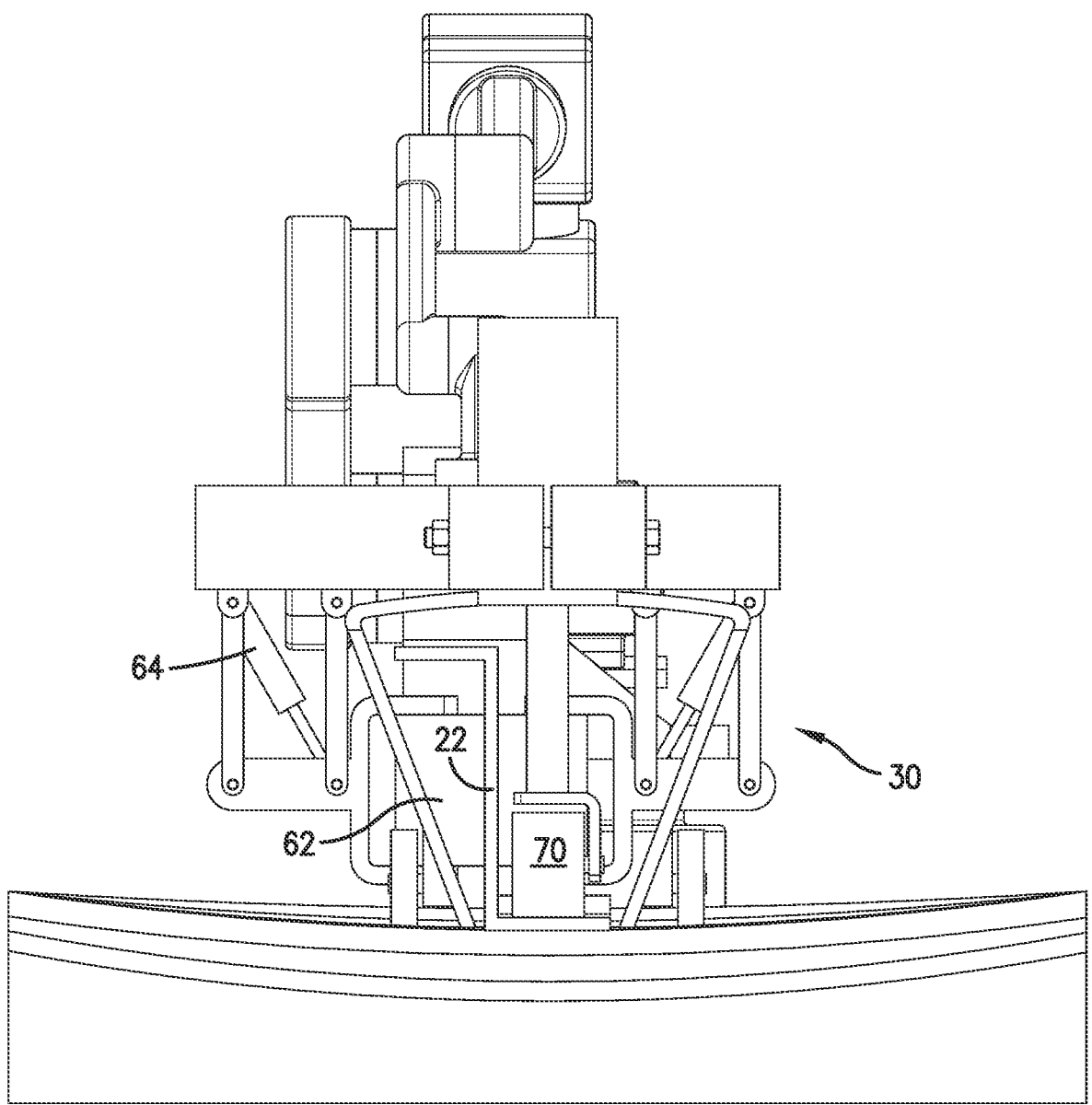
FIG. 8 is a fragmentary cross-sectional front elevation view of the system of FIG. 5.
Figure 11:
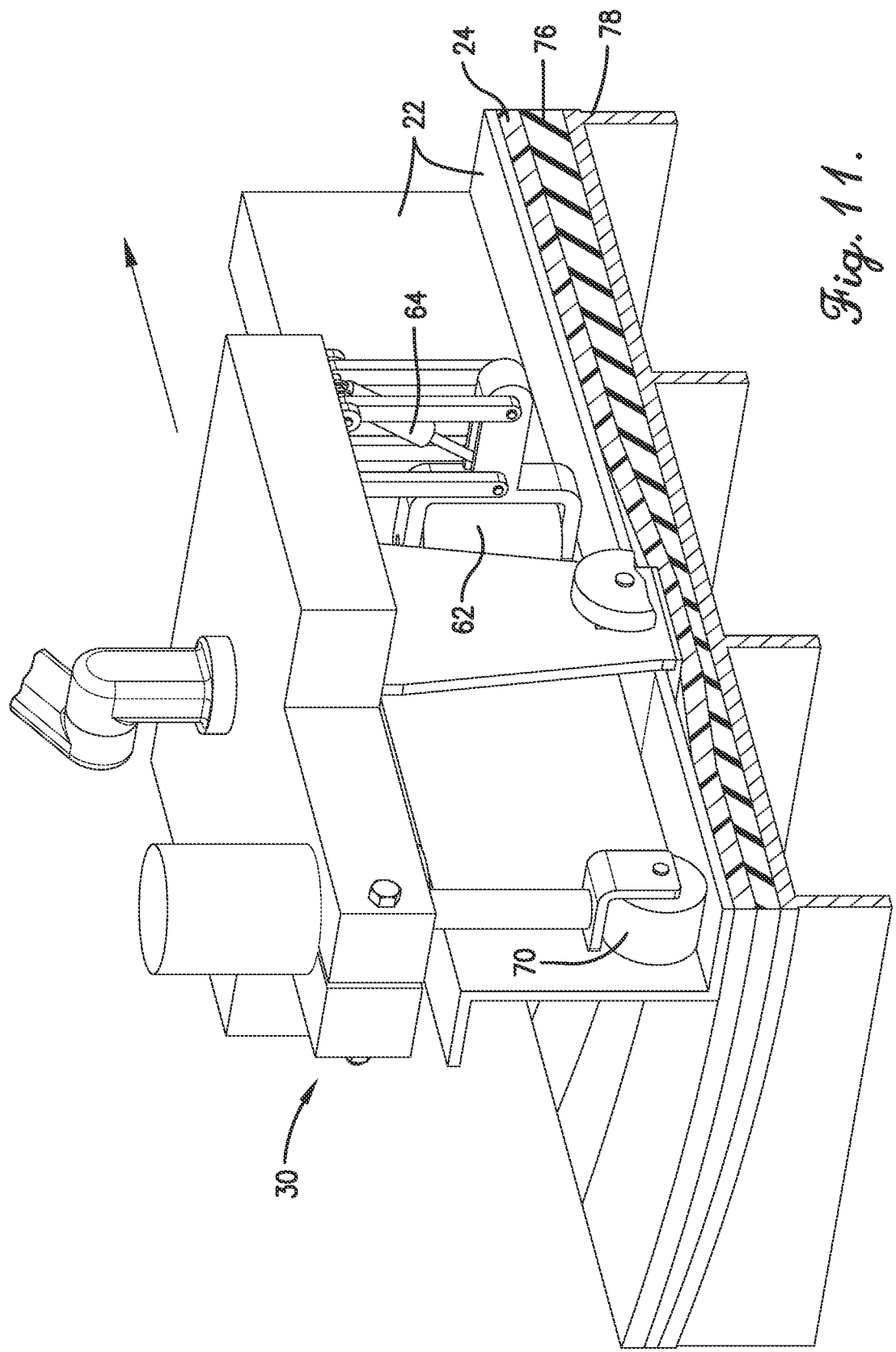
FIG. 11 is a fragmentary isometric view of an implementation of the system of FIG. 1, wherein a plate element component of the system is supported on one side (i.e., cantilevered)
Figure 12:
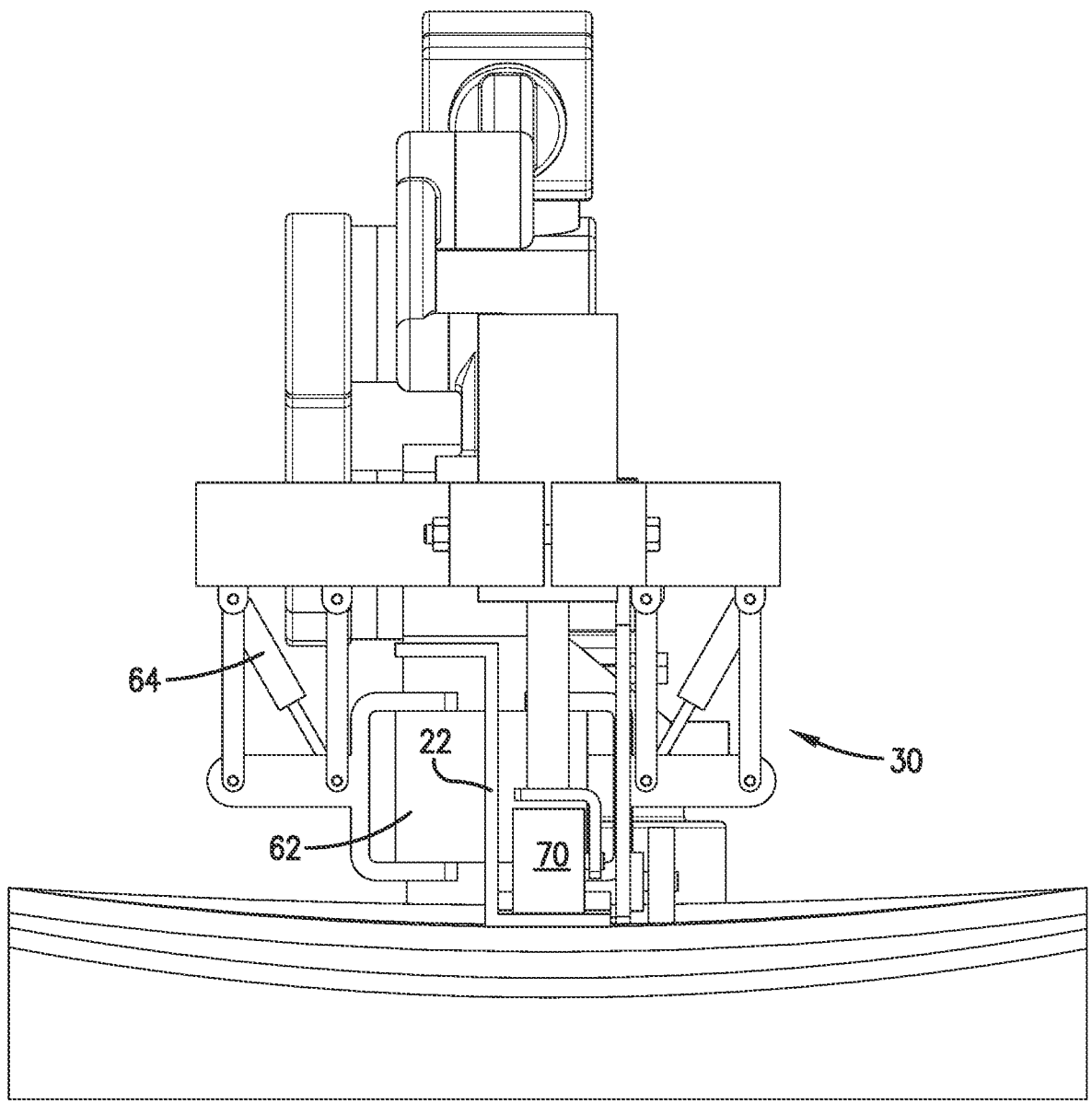
FIG. 12 is a fragmentary cross-sectional front elevation view of the system of FIG. 11.

Referring initially to FIGS. 1 and 2, an embodiment of a system 20 is shown for welding a first thermoplastic component 22 to a second thermoplastic component 24 to construct a composite structure 26. In one example application, the first component 22 may be an aircraft stringer or other relatively rigid component, and the second component may be an aircraft skin or other relatively flexible component. The system 20 may include a plate element 28 and a manipulator mechanism 30. The plate element 28 may be configured to be positioned between an initial or current portion 32a of a first faying surface 34 of the first thermoplastic component 22 and a second faying surface 36 of the second thermoplastic component 24, and to be heated to an operating temperature which is sufficient to melt the portion 32a of the first faying and second faying surfaces 34,36.

The thickness of the plate element 28 may depend, at least in part, on the natures of the first and/or second components 22,24 and the particular application and requirements of the welding process. In general, it may be desirable for the plate element 28 to be relatively thin so as to minimize the deflection of the first and/or second components 22,24 as the plate element 28 moves between them. Relatedly, the maximum ability of the first and/or second component 22,24 to deflect may determine an upper limit on the thickness of the plate element 28. In various implementations, the plate element 28 may have a thickness of approximately between 0.005 inches and 0.05 inches, approximately between 0.01 inches and 0.03 inches, or approximately 0.02 inches. The thickness of the plate element 28 may also depend, at least in part, on the nature and design of the manipulator mechanism 30 which supports the plate element 28. For example, a cantilevered plate element may be relatively thicker to avoid buckling, while a plate element supported on both ends may be relatively thinner. The plate element 28 may be constructed of substantially any suitable material, such as nichrome, titanium, Inconel, stainless steel, or other high temperature, corrosion resistant metal. In one implementation, the plate element 28 may be constructed of a material having a relatively high electrical resistance to facilitate joule (or resistance) heating.

The plate element 28 may be heated by one or more heating circuits. More specifically, the plate 28 may be joule heated to an operating temperature by passing an electric current through the material of the plate. The operating temperature of the plate 28 may depend, at least in part, on the natures of the first and/or second components 22,24 and the particular application and requirements of the welding process. In general, the operating temperature may be sufficient to melt the first and second faying surfaces 34,36 and accomplish the desired weld. Thus, the minimum operating temperature may be the melting point of the first and second faying surfaces 34,36, and the maximum temperature may be determined by the ability to transfer enough heat sufficiently quickly so to avoid degradation/decomposition of the first and second components 22,24 due to the heat. In particular, it may be desirable to heat the first and second faying surfaces 34,36 while minimizing heating of the bodies of the first and second components 22,24.

The temperature of the plate element 28 may be measured by one or more first sensors 40 (shown in FIGS. 3 and 4) at one or more locations on the plate element 28. Multiple measurements at different points may be desirable if the plate element 28 loses more heat in one region than in another region due to, e.g., a heat sink effect. In one implementation, one or more thermocouples may be used to measure the temperature of the plate element 28. Relatedly, multiple independently controllable heating circuits may be used to heat the plate element 28 to better compensate for any such differences in temperature across the plate element 28, and to allow for greater flexibility in how the faying surfaces 34,36 are heated. The temperature of the first and second faying surfaces 34,36 may be at least as relevant as the temperature of the plate element, in which case the temperature of the first and second faying surfaces 34,36 may be measured by one or more second sensors 42 (shown in FIGS. 3 and 4) at one or more locations on the faying surfaces 34,36. In one implementation, one or more optical temperature sensors may be used to measure the temperature of the first and second faying surfaces 34,36.

In one implementation, additional resin may be introduced and melted between the faying surfaces 34,36 to facilitate bonding. This additional resin may be provided in the form of injected liquid resin, solid resin film, or an additional layer of prepreg (i.e., an extra layer of fiber and resin).

In a first or "contact" implementation, shown in FIG. 3, the plate element 28 may be generally in physical contact with the faying surfaces 34,36 while the plate element 28 moves between and heats the faying surfaces 34,36 through conduction. In the contact implementation, a front portion 44 of the plate element 28 may be provided with a rake angle to direct or otherwise control any excess thermoplastic resin material from the first and second faying surfaces 34,36. More specifically, the rake angle may sweep the excess resin to the centerline of the weld where it may be squeezed out of the way, which promotes the ejection of air from between the first and second components 22,24. In various implementations, the rake angle may be approximately between 10 degrees and 50 degrees, or approximately between 20 degrees and 40 degrees.

Figure 15:
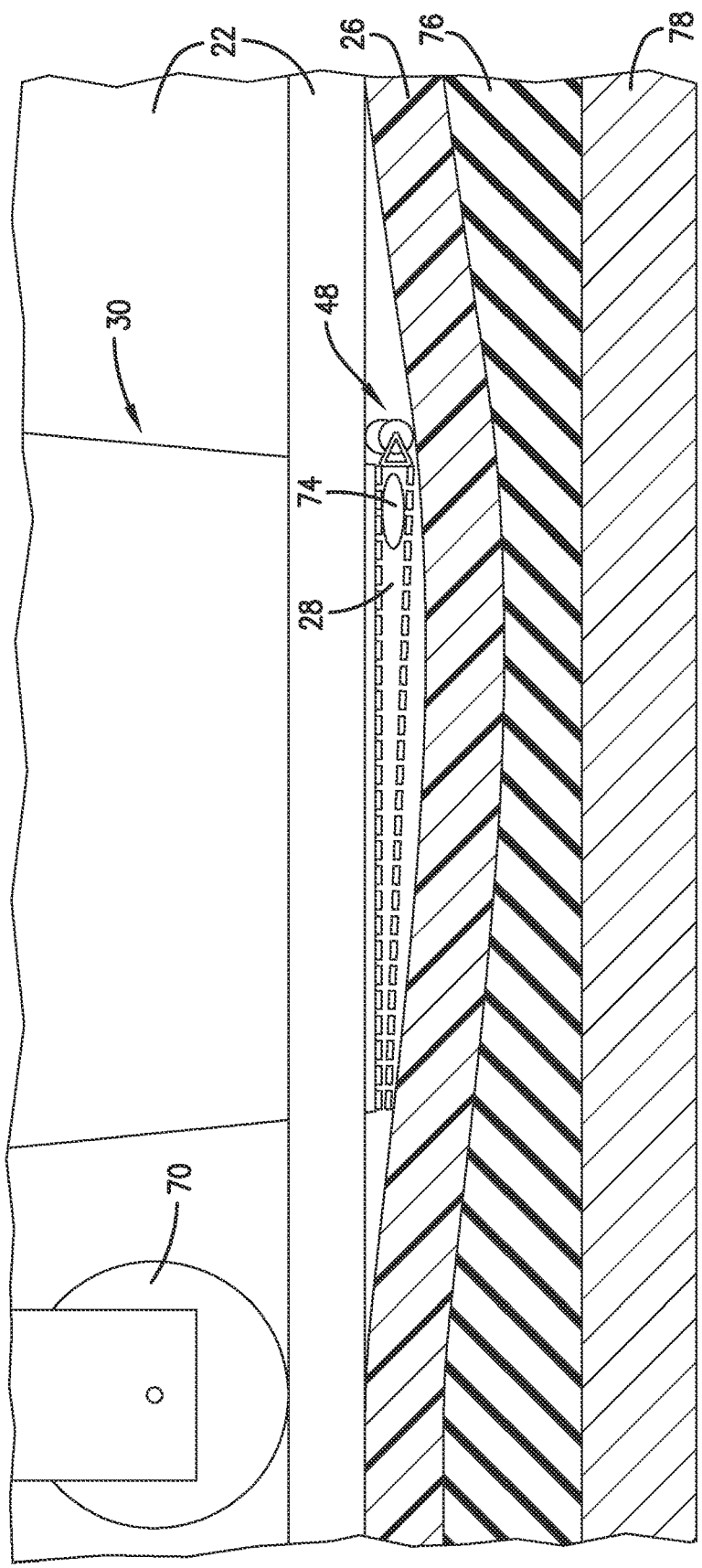
FIG. 15 is a fragmentary cross-sectional side elevation view of the system of FIG. 5.
Figure 16:
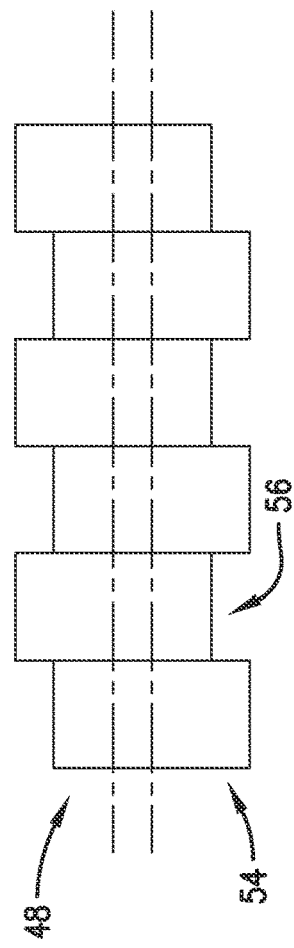
FIG. 16 is a fragmentary front elevation view of a roller element component of the system of FIG. 15.

In a second or "gap" implementation, shown in FIGS. 4, 15, and 16, the plate element 28 may be generally suspended between and not in physical contact with the faying surfaces 34,36 as the plate element 28 moves between and heats the faying surfaces 34,36 through radiation and convection. In the gap embodiment, a spacer element 46 may be provided to create a gap in which at least the heated portion of the plate element 28 moves, and thereby prevents the faying surfaces 34,36 from physically contacting at least this heated portion of the plate element 28. In one implementation, the spacer element 44 may be provided by thickening or shaping an unheated front portion of the plate element 28 to separate the faying surfaces 34,36 around the heated portion of the plate element 28. In another implementation, the same spacing effect may be accomplished by physically forcing (e.g., pulling or pushing) the first and/or second faying surfaces 34,36 apart. In another implementation, a wedge or roller element 48 may be provided at the leading edge of the plate element 28 to create the gap. As shown in FIG. 16, the roller element 48 may include a plurality of rollers which may be offset from each other so that some of the rollers 54 roll across the first faying surface 34 and others of the rollers 56 roll across the second faying surface 36. Such as roller element advantageously avoids dragging across and potentially damaging or contaminating the faying surfaces 34,36. One advantage of the gap embodiment is that it avoids physical, high temperature contact which could otherwise damage or misalign the fibers of the first and second thermoplastic components. However, the gap embodiment may require a higher operating power than the contact embodiment due to convection heat losses. In various implementations, an air nozzle 80 may introduce air into the gaps between the plate element 28 and the faying surfaces 34,36 to enhance convection, and/or one or more holes 82 may be provided in the plate element 28 itself to enhance convection.

Referring also to FIGS. 5-15, the manipulator mechanism 30 may be configured to move the heated plate element 28 between the first and second faying surfaces 34,36, from one end of the interface 58 of the first and second components 22,24 to the other end, such that the plate element 28 heats and melts the portion 32a of the first and second faying surfaces 34,36, and such that as the plate element 28 is moved along the interface 58, the heated and melted portions of the first and second faying surfaces 34,36 bond together as they cool and re-solidify behind the plate element 28. The manipulator mechanism 30 may support the plate element 28 on both sides of the plate element, as shown in FIGS. 5-10, or may support the plate element 28 only on one side (i.e., cantilevered), as shown in FIGS. 11-14. The manipulator mechanism 20 may move the plate element 28 at a rate of movement that maintains the plate element 28 in position for a sufficient time to heat the faying surfaces 34,36 to the melting temperature. The movement rate may be substantially continuous or potentially variable in order to better maintain particular temperatures. The rate of movement may depend on such factors as the operating temperature of the plate element 28 and the rate of heat transfer from the plate element 28 to the faying surfaces 34,36. Further, the manipulator mechanism 30 may move the plate element 28 at a speed that maintains the operating temperature with the available power or may adjust the power to support the desired movement speed in a closed control loop such that the peak temperature (plate temperature) and the adherend surface temperature after the passage of the plate element 28 are both within the appropriate temperature range for obtaining a strong weld without degrading the thermoplastic components 22,24.

The manipulator mechanism 20 may further include a guide roller 62 configured to guide movement of and ensure desired positioning of the plate element 28 between the first and second faying surfaces 34,36. In one implement, the guide roller 62 may roll over a surface of one of the components 22,24. The first and second components 22,24 may be positioned by tooling, or the manipulator mechanism 30 may include a guidance feature to position one of the components relative to the other. In one implementation, the manipulator mechanism 20 may further include a compliance spring, arm, or cylinder or similar compliance element 64 configured to maintain the guide roller 62 in contact with the surface of the component 22,24 as the plate element 28 is moved. Relatedly, the system 20 may further include one or more temporary or permanent fasteners 66a,66b positioned at the extreme ends of the first and second components 22,24 as desired or necessary to maintain the component 22,24 in proper alignment, though permanent fasteners may limit how closely the weld can approach these ends.

In one implementation, the manipulator mechanism 30 may use only localized pressure applied by the manipulator mechanism 30 because the mass of the material being heated is less than with most other welding methods and no foreign material is being introduced. In another implementation, the manipulator mechanism 30 may further include a pressure roller 70 configured to press the melted first and second faying surfaces 34,36 together behind the plate element 28 as the plate element 28 is moved along the interface 58 by the manipulator mechanism 30, thereby facilitating the bonding together of the cooling first and second faying surfaces 34,36. The pressure applied by the pressure roller 70 may depend on the nature of the first and second components 22,24. In particular, stiffer components may require greater pressure. In one implementation, the pressure applied by the pressure roller may be at least 1 bar.

In one implementation, the manipulator mechanism 20 may further include a cooling nozzle 72 configured to deliver a cooling fluid, such as compressed air, refrigerant, or water, may be impinged against the first and second components 22,24 to accelerate cooling as desired or necessary. In one implementation, the manipulator mechanism 20 may further include an inert gas nozzle 74 configured to deliver an inert gas into the weld area in order to displace the oxygen in the weld area and thereby reduce the potential for oxidation and/or fire during the heating and consolidating phases. In one implementation, the system 20 may further include a support surface 76 position beneath, behind, or otherwise adjacent to the second component 24. The support surface 76 may be compressible or otherwise flexible so as to accommodate a deflection of the second component 24 as the plate element 28 moves between first and second faying surfaces 34,36. For example, in the example application in which the first component is a stringer and the second component is a skin, because the skin is much more flexible than the stiffener, the skin may be placed on the support surface 76, and the support surface 76 may compress or otherwise flex to accommodate the deflection of the skin, while also providing a constant reaction force against the plate element 28 and the melted weld line. The support surface 76 may itself rest upon a flat or contoured tool 78.

Figure 17:
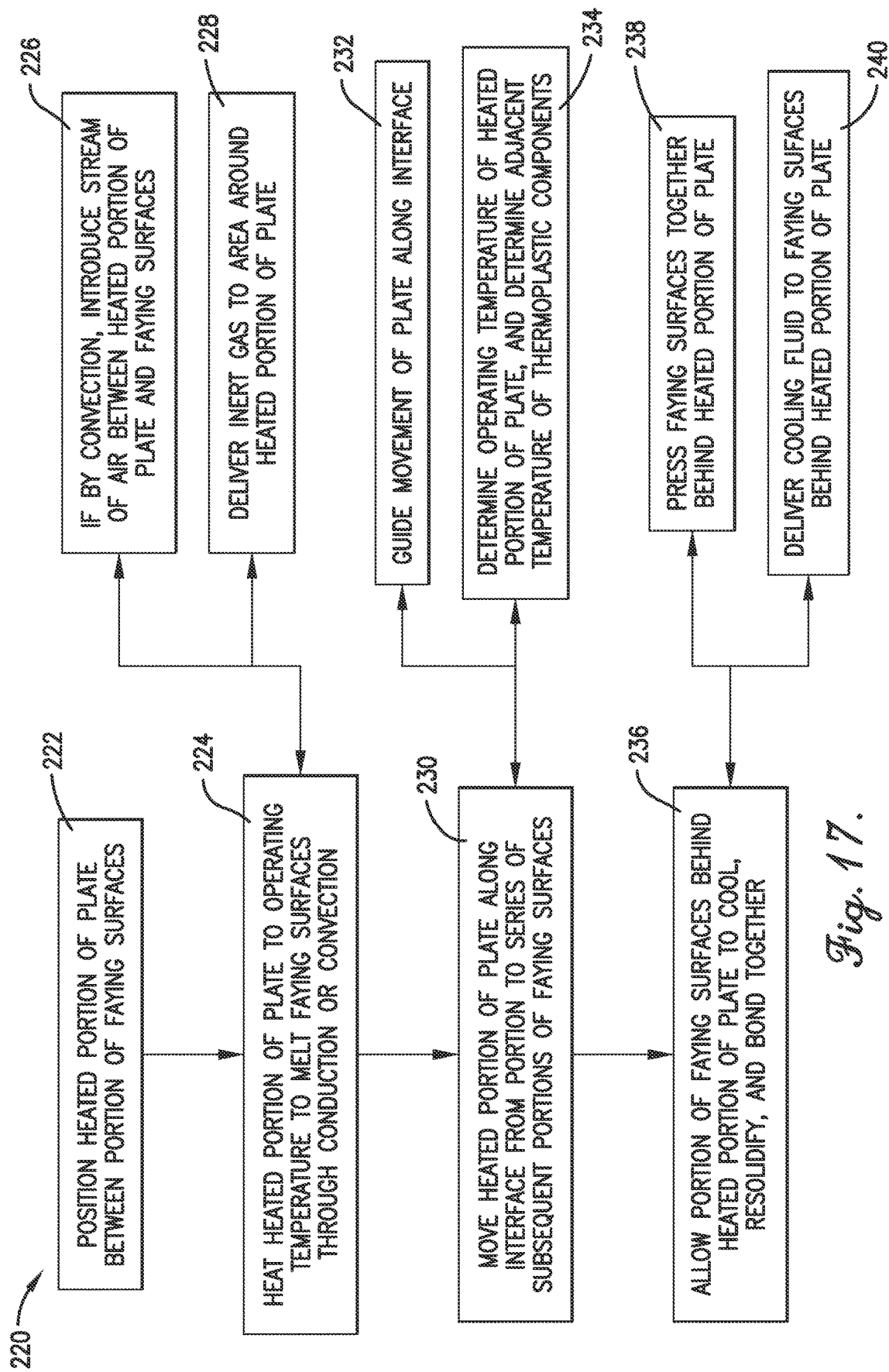
FIG. 17 is a flowchart of steps involved in a method of welding first and second thermoplastic component to create a composite structure, wherein the system is shown in a starting position.

Referring to FIG. 17, the system 20 may function substantially as follows to weld the first thermoplastic component 22 to the second thermoplastic component 24 along the interface 58 to create the composite structure 26. Additional functionality of the system 20 may be reflected in the steps of the method 200 discussed below. Broadly, the heated portion of the plate element 28 may be positioned between the portion 32a of the first faying surface 34 of the first thermoplastic component 22 and the second faying surface 36 of the second thermoplastic component 24, as shown in 222. The heated portion may be heated to the operating temperature which is sufficient to melt the matrix of the first and second faying surfaces 34,36, as shown in 224. The manipulator mechanism 30 may move the heated portion of the plate element 28 along the interface 58 from between the portion 32a of the first and second faying surfaces 34,36 to between the series of subsequent portions 32b-32e of the first and second faying surfaces 34,36, as shown in 230. As the plate element 28 is moved along the interface 58, the portion of the first and second faying surfaces 34,36 behind the plate element 28 is no longer exposed to the operating temperature and so begins to cool and re-solidify and bond together, as shown in 236, which results in the first thermoplastic component 22 being welded to the second thermoplastic component 24 along the interface 58 to create the composite structure 26.

The system 20 may include more, fewer, or alternative components and/or perform more, fewer, or alternative actions, including those discussed elsewhere herein, and particularly those discussed in the following section describing the method 220.

Referring again to FIG. 17, an embodiment of a method 220 is shown for welding a first thermoplastic component 22 to a second thermoplastic component 24 along an interface 58 to create a composite structure 26. The method 220 may be a corollary to the functionality of the system 20 described above and may be similarly implemented using the various components of the system 20. Broadly, the method 220 may proceed substantially as follows.

A heated portion of a plate element 28 may be positioned between a portion 32a of a first faying surface 34 of the first thermoplastic component 22 and a second faying surface 36 of the second thermoplastic component 24, as shown in 222. The heated portion may be heated to an operating temperature which is sufficient to melt the matrix resin of the portion 32a of the first and second faying surfaces 34,36 without exceeding a decomposition temperature of the first and second components 22,24, as shown in 224. The heated portion may be heated by joule heating or by substantially any other suitable technique, and the resulting heat may be transferred to the portion 32a of the first and second faying surfaces 34,36 by conduction or radiation or convection. In an implementation in which heat is transferred from the plate element 28 to the first and second faying surfaces 34,36 by convection, an air nozzle 80 or similar mechanism may be used to introduce a stream of air or other inert gas between at least the heated portion of the plate element 28 and the first and second faying surfaces 34,36 so as to enhance convection and/or reduce oxidation, as shown in 226. In one implementation, an inert gas nozzle 74 or similar mechanism may be used to deliver an inert gas to displace oxygen around the heated portion of the plate element 28, as shown in 228.

A manipulator mechanism 30 may move the heated portion of the plate element 28 along the interface 58 from between the portion 32a of the first and second faying surfaces 34,36 to between a series of subsequent portions 32b-32e of the first and second faying surfaces 34,36, as shown in 230. As the plate element 28 is moved along the interface 58, the portion of the first and second faying surfaces 34,36 behind the plate element 28 is no longer exposed to the operating temperature and so begins to cool and re-solidify and bond together, as shown in 236, which results in the first thermoplastic component 22 being welded to the second thermoplastic component 24 along the interface 58 to create the composite structure 26. In one implementation, a guide roller 62 or similar mechanism may be used to guide movement of the plate element 28 along the interface 58 between the first and second faying surfaces 34,36, as shown in 232.

A first temperature sensor 40 may be used to determine the operating temperature of the heated portion of the plate element 28, and a second temperature sensor 42 may be used to determine a temperature of the first and second thermoplastic components 22,24, as shown in 234, and this information may be used to control the heating of the heated portion of the plate element 28 and the speed with which the manipulator mechanism 30 moves the heated portion along the interface 58.

In one implementation, a pressure roller 70 or similar mechanism may be used to apply a pressure to press the cooling first and second faying surfaces 34,36 together behind the plate element 28 to enhance bonding as the plate element 28 is moved along the interface 58, as shown in 238. In one implementation, a cooling nozzle 72 or similar mechanism may be used to deliver a cooling gas or other fluid to accelerate cooling of the first and second faying surfaces 34,36 behind the plate element 28 to hasten re-solidification and bonding as the plate element 28 is moved along the interface 58, as shown in 240.

The method 220 may include more, fewer, or alternative actions, including those discussed elsewhere herein.

In addition and/or in conjunction with one or more of the embodiments described above, FIG. 18 depicts an alternative system 320 for welding a first thermoplastic component 322 to a second thermoplastic component 324 along an interface 358 to create a composite structure. Many of the components of the system 320 may be substantially similar or identical to the system 20 described and depicted herein, but with the addition of an injection device 384 and/or an actuator 386 for jabbing the injection device 384 between first and second faying surfaces of the first and second thermoplastic components 322,324. Specifically, the injection device 384 may be configured to deposit polymer between the first faying surface and the second faying surface following passage of the heated portion of a plate passed therebetween. By injecting a melt temperature compatible miscible and/or amorphous polymer or thermoplastic in a controlled rate and pattern into the interface (e.g., weld line) just behind or ahead of the plate or its heated portion, crack propagation resistance of the joint is maximized. The first and second thermoplastic components 322,324 (as well as the first and second thermoplastic components 22,24 described herein) may comprise a semi-crystalline thermoplastic polymer such as polyether ether ketone (PEEK), poly-ether-ketone-ketone (PEKK), other polyaryle ether ketones (PAEK) materials, poly-phenylene-sulfide (PPS), or the like.

In some embodiments, the system 320 may include a plate 328, a manipulator 330 mechanically coupled with the plate 328, a support surface 376, and a pressure roller 370 that are substantially similar or identical to the plate element 28, the manipulator mechanism 30, the support surface 76, and the pressure roller 70, respectively. In addition, any of the other components of system 20 or additional components described herein may be incorporated into the system 320 without departing from the scope of the technology herein. The injection device 384 may be attached to the plate 328 and/or the manipulator 330 and may be actuatable along the interface (e.g., weld line) by the manipulator 330. The pressure roller 370 may be configured for pressing the first and second faying surfaces together behind the plate 328 as the plate 328 is moved along the interface, similar to previous embodiments. The injection device 384 may be configured to deposit the polymer between the plate 328 and the pressure roller 370 as depicted in FIG. 18.

The injection device 384 may comprise a needle 388 configured for depositing a polymer 390. For example, the polymer 390 may be dispensed into a thin gap created by the plate 328 while the first and second faying surfaces 334,336 are molten with a thin hypodermic needle manipulated in a jabbing motion to create a bead pattern of molten resin or polymer. The needle 388 may be heated via conduction, direct resistance, joule heating, or induction, such as induction due to proximity to a heated portion of the plate 328 and/or susceptibility to alternating magnetic fields emitted by the induction coil used to heat a portion of the plate 328. Furthermore, in some embodiments, the injection device 384 may be integrally formed or otherwise directly joined with the plate 328. For example, the injection device 384 may be configured such that the polymer 390 is dispensed through openings in the plate 328 or through tubes or needles that are attached to the plate 328.

In some embodiments, the polymer 390 may be a miscible and/or an amorphous thermoplastic polymer. The term "miscible" herein refers to the polymer 390 having melt-temperature compatibility and chemical compatibility with the material of the first and second thermoplastic components 322,324 and/or their faying surfaces. Specifically, the chemical compatibility may refer to a polymer's ability to chemically bond to the first and second thermoplastic components and the melt-temperature compatibility generally refers to having a melting point within a same or proximate temperature range to that of the first and second thermoplastic components 322,324. In some embodiments, the polymer 390 may be a resin providing a resin-rich area in a bond line between the first and second thermoplastic components 322,324. In embodiments where the polymer 390 is amorphous, the polymer may advantageously have a higher toughness and more elongation sufficient to stop or reduce cracks, prevent pealing, and the like. One example of the polymer 390 or amorphous polymer useful in the system and methods described herein may be polyetherimide (PEI). However, other polymers may be used without departing from the scope of the technology described herein. In other embodiments, the polymer 390 may be an amorphous polymer or a semi-crystalline polymer modified to have more amorphous regions than the material forming the first and second thermoplastic components 322,324. In use, the polymer 390 may be heated to a temperature to keep the polymer in a molten state during delivery from the needle 388 and/or the injection device 384.

In some embodiments, the injection device may comprise components similar to a three-dimensional printer, such as a polymer filament roll 392 and a liquefier 394. The liquefier 394 may comprise at least one heat source configured for liquefying the polymer filament received from the polymer filament roll 392 and delivering the liquefied polymer filament to the needle 388 (e.g., via extrusion) for deposition between the first faying surface and the second faying surface. The needle 388 may also be heated by the heat source to assist in maintaining the polymer 390 in a molten state as it is delivered between the faying surfaces. However, in other embodiments, the at least one heat source may additionally or alternatively include the heated portion of the plate 328, which thus heats the needle 388 via conduction. For example, the needle 388 may be located a short distance aftward of the plate 328 and/or at least partially contact an aft region of the plate 328, which is heated as described above.

In some example embodiments, the needle 388 may be configured similar to a hypodermic needle that is hollow to allow liquid to be delivered therethrough, deposited via a syringe or other fluid delivery systems. Furthermore, the needle 388 may have, for example, one or more 90-degree emitter orifices (rather than coming out of an end). This configuration may allow the polymer 390 to be deposited in a backwards or downstream direction so that no smearing of the polymer 390 by the needle 388 occurs (e.g., no syringe sliding through its own molten material).

The actuator 386 can be part of and/or mechanically attached to a portion of the injection device 384 and may be configured to reciprocally and/or intermittently extend and retract the needle 388 between the first faying surface and the second faying surface. In some embodiments, the motion of the syringe 388 actuated via the actuator is referred to as a jabbing motion, moving back and forth in a transverse direction. The transverse direction is indicated by arrow 397 as opposed to a travel direction of the manipulator 330 indicated by arrow 399. A ratio of a transverse rate (e.g., reciprocation or jabbing rate) at which the actuator 386 extends and retracts the needle 388 relative to a travel rate of the plate 328 and/or manipulator 330 along the interface may determine a waveform or pattern of the polymer deposited between the first faying surface and the second faying surface. Adjusting these rates or the ratio therebetween may control the deposition pattern to provide a coverage area desired, air escape routes, and sufficient edge margins to prevent polymer or resin squeeze-out. Furthermore, sufficient edge margins (where the first and second faying surfaces mate/weld together free of any polymer) may create a protective seal around the polymer, protecting the polymer from solvent or fluid while simultaneously creating a more secure, damage-tolerant joint.

In some example embodiments, the polymer may be deposited such that the entire faying surfaces/weld line is dominated by the polymer except for the edges, where a semi-crystalline weld may protect the polymer from fluid attack. Alternatively, the polymer may be deposited in intermittent stripes as depicted in FIG. 18, which may advantageously force a crack to propagate through a matrix material discontinuity and/or improve the stiffness of the weld joint when compared to a polymer-dominated interface/weld line. In other embodiments, the polymer may be deposited in a continuous waveform configuration such as a zig-zag pattern, a sawtooth waveform, a square waveform, and/or a sinusoidal waveform. These various waveform configurations may advantageously assist in ejecting air from the resulting joint. That is, with some patterns of injection, converging flow fronts may disadvantageously trap air, but waveform patterns such as chevron or zig-zag patterns may instead converge from center-to-edge as pressure is applied (e.g., via the pressure roller 370).

In some alternative embodiments of the system 320, the injection device 384 may locate the needle 388 ahead of the plate 328 and the polymer may function as a lubricity and boundary layer to protect fibers in the first and/or second thermoplastic components (e.g., laminates) from being disoriented by friction. Additionally or alternatively, in some embodiments, the plate 328 may be shaped or grooved to provide distribution or concentration of molten polymer as needed to promote joint toughness and isolate the polymer from fluids. In some alternative embodiments, additional needles located near edges of the interface/welded joint may dispense additional semi-crystalline resin or the like to ensure that the polymer is completely encapsulated in the joint and not be subject to solvent attack. The polymer may have greater toughness and crack arresting properties and may be deposited along with the semi-crystalline resin at the interface or bond line to allow for greater load carrying capability and joint toughness. In some embodiments, the system 320 and its injection device 384 may also be used in co-fusion methods for similar purposes.

A method 400 for welding a first thermoplastic composite component to a second thermoplastic composite component along an interface to create a composite structure is depicted in FIG. 19. The method 400 may be a corollary to the functionality of the system 320 described above and may be similarly implemented using the various components of the system 320. Broadly, the method 400 may proceed substantially as follows. The method 400 may include a step of aligning the first and second thermoplastic composite components along the interface, as depicted in block 402, such that a first faying surface of the first thermoplastic composite component is in contact with a second faying surface of the second thermoplastic composite component. The method 400 may further include the steps of positioning a plate (e.g., the plate 328) between a portion of the first faying surface and the second faying surface, as depicted in block 404, and heating at least a portion of the plate to a temperature which is sufficient to melt the portion of the first and second faying surfaces, as depicted in block 406.

Furthermore, the method 400 may include a step of moving the plate with the manipulator, as depicted in block 408, in a direction along the interface from between the portion of the first and second faying surfaces to between a series of subsequent portions of the first and second faying surfaces. The step of block 408 may be conducted such that the first faying surface remains in contact with the second faying surface in front of and behind the plate relative to the direction the plate is moving. The second thermoplastic composite component may flex away from the first thermoplastic composite component at the portion of the first and second faying surfaces to accommodate the plate. In some embodiments, the method step depicted in block 408 may also include the manipulator moving the needle 388 of the injection device 384 along with the plate 328 between the first and second faying surfaces.

The method 400 may also include a step of actuating a needle (e.g., the syringe 388) of an injection device behind the plate, as depicted in block 410, to deposit miscible and/or amorphous polymer between the first faying surface and the second faying surface. As described above in regard to the system 320, actuating the needle may include an actuator (e.g., the actuator 386) reciprocally actuating the needle 388 at least partially into and partially out from between the first and second faying surfaces, thereby depositing the polymer in a repetitive pattern such as stripes or a waveform pattern. Furthermore, this actuating step may include actuating the needle 388 in a reciprocal jabbing motion at a right angle relative to the direction in which the manipulator moves the plate. However, this jabbing motion may occur at other angles relative to the direction of travel of the manipulator without departing from the scope of the technology described herein.

In some embodiments, the method 400 may include a step of supporting the second thermoplastic composite component with a support surface (e.g., the support surface 376), as depicted in block 412. The support surface, as described above, may be flexible so as to accommodate a flexing of the second thermoplastic composite component due to the plate 328 positioned and moving between the portion of the first and second faying surfaces. Furthermore, the method 400 may comprise a step of pressing the first and second faying surfaces together with the polymer therebetween, as depicted in block 414. Specifically, this pressing may be conducted with a pressure roller behind the plate 328 and the needle 388 and may occur sequentially as the plate is moved along the interface. For example, in some embodiments, the pressure roller 370 may be actuated onto and rolled along an outer surface of one of the first or second thermoplastic components by actuation of the manipulator 330, which likewise continues to also actuate the plate 328 and the injection device 384.

Although the invention has been described with reference to the one or more embodiments illustrated in the figures, it is understood that equivalents may be employed and substitutions made herein without departing from the scope of the invention as recited in the claims. For example, although the manipulator is described as moving various components to travel along an interface between the first and second thermoplastic components, an alternative embodiment may include the manipulator instead moving the first and second thermoplastic components relative to the plate, the injection device, and/or the pressure roller, for example, while those components are held in place. This could be accomplished, for example, by actuating the support surface to move, causing the first and second thermoplastic components to travel while the plate remains in place.

Having thus described one or more embodiments of the invention, what is claimed as new and desired to be protected by Letters Patent includes the following:

The invention claimed is:

1. A system for welding a first thermoplastic composite component to a second thermoplastic composite component along an interface to create a composite structure, the system comprising:
    a plate comprising a heated portion positioned between a first faying surface of the first thermoplastic component and a second faying surface of the second thermoplastic component, the heated portion being heated to a temperature which is sufficient to melt the portion of the first and second faying surfaces;
    an injection device configured to deposit polymer between the first faying surface and the second faying surface following passage of the heated portion of the plate passes therebetween; and
    a manipulator mechanically coupled with the plate and moving the plate along the interface between the first and second faying surfaces;
    wherein the injection device comprises a needle configured for depositing the polymer and a needle heat source that heats the needle independently of heating of the plate.

2. The system of claim 1, wherein the injection device is attached to at least one of the plate and the manipulator and is actuatable along the interface by the manipulator.

3. The system of claim 1, wherein the needle is heated via conduction, induction, or joule heating.

4. A system for welding a first thermoplastic composite component to a second thermoplastic composite component along an interface to create a composite structure, the system comprising:
    a plate comprising a heated portion positioned between a first faying surface of the first thermoplastic component and a second faying surface of the second thermoplastic component, the heated portion being heated to a temperature which is sufficient to melt the portion of the first and second faying surfaces;
    an injection device configured to deposit polymer between the first faying surface and the second faying surface following passage of the heated portion of the plate passes therebetween; and
    a manipulator mechanically coupled with the plate and moving the plate along the interface between the first and second faying surfaces;
    wherein the injection device comprises a needle configured for depositing the polymer;
    wherein the injection device further comprises a polymer filament roll and a liquefier, wherein the liquefier comprises at least one heat source configured for liquefying the polymer filament and delivering the liquefied polymer filament to the needle for deposition between the first faying surface and the second faying surface.

5. The system of claim 1, wherein the injection device further comprises an actuator configured to reciprocally extend and retract the needle between the first faying surface and the second faying surface.

6. The system of claim 1, wherein the polymer is an amorphous polymer.

7. The system of claim 1, further comprising a support surface positioned against the second thermoplastic composite component, the support surface being flexible so as to accommodate a flexing of the second thermoplastic composite component due to the plate positioned and moving between the first and second faying surfaces.

8. The system of claim 1, the manipulator further comprising a pressure roller pressing the first and second faying surfaces together behind the plate as the plate is moved along the interface, wherein the injection device is configured to deposit the polymer between the plate and the pressure roller.

9. A method for welding a first thermoplastic composite component to a second thermoplastic composite component along an interface to create a composite structure, the method comprising:

aligning the first and second thermoplastic composite components along the interface, such that a first faying surface of the first thermoplastic composite component is in contact with a second faying surface of the second thermoplastic composite component;

positioning a plate between a portion of the first faying surface and the second faying surface;

heating at least a portion of the plate to a temperature which is sufficient to melt the portion of the first and second faying surfaces;

moving the plate with a manipulator mechanically coupled with the plate in a direction along the interface from between the portion of the first and second faying surfaces to between a series of subsequent portions of the first and second faying surfaces, such that the first faying surface remains in contact with the second faying surface in front of and behind the plate relative to the direction the plate is moving; and introducing additional resin between the faying surfaces to facilitate bonding.

10. The method of claim 9, wherein the second thermoplastic composite component flexes away from the first thermoplastic composite component at the portion of the first and second faying surfaces to accommodate the plate.

11. The method of claim 9, further comprising pressing, with a pressure roller behind the plate, the first and second faying surfaces together with the polymer therebetween as the plate is moved along the interface.

12. A system for welding a first thermoplastic composite component to a second thermoplastic composite component along an interface to create a composite structure, the system comprising:

a plate comprising a heated portion positioned between a first faying surface of the first thermoplastic component and a second faying surface of the second thermoplastic component, the heated portion being heated to a temperature which is sufficient to melt the portion of the first and second faying surfaces;

an injection device configured to deposit polymer between the first faying surface and the second faying surface following passage of the heated portion of the plate passes therebetween, the injection device comprising a needle that deposits the polymer, wherein the polymer is an amorphous thermoplastic polymer;

a manipulator mechanically coupled with the plate and the injection device and actuatable to move the plate and the injection device along the interface between the first and second faying surfaces;

an actuator operable to reciprocally extend and retract the needle between the first faying surface and the second faying surface for depositing the polymer in a repeating pattern; and a support surface positioned against the second thermoplastic composite component, the support surface being flexible so as to accommodate a flexing of the second thermoplastic composite component due to the plate positioned and moving between the first and second faying surfaces.

13. The system of claim 12, wherein the needle is heated via conduction, induction, joule heating, or induction due to proximity to the heated portion of the plate.

14. The system of claim 12, wherein the injection device further comprises a polymer filament roll and a liquefier, wherein the liquefier comprises at least one heat source configured for liquefying the polymer filament and delivering the liquefied polymer filament to the needle for deposition between the first faying surface and the second faying surface.

15. The system of claim 12, wherein a ratio of a transverse rate at which the actuator extends and retracts the needle relative to a travel rate of the manipulator determines a continuous repetitive waveform pattern of the polymer deposited between the first faying surface and the second faying surface.

16. The system of claim 12, the manipulator further comprising a pressure roller pressing the first and second faying surfaces together behind the plate as the plate is moved along the interface, wherein the injection device is configured to deliver the polymer between the plate and the pressure roller.

17. The method of claim 9, wherein the additional resin is provided in the form of injected liquid resin.

18. The method of claim 9, further comprising melting the additional resin.

19. The method of claim 9, further comprising melting the additional resin between the faying surfaces.

* * * * *